United States Patent [19]

Müenchow et al.

[11] 4,213,155
[45] Jul. 15, 1980

[54] PROCESS FOR IMPROVING IMAGE QUALITY IN PICTURE TELEGRAPHY

[75] Inventors: Jüergen Müenchow, Kiel; Ruediger Sommer, Raisdorf, both of Fed. Rep. of Germany

[73] Assignee: Dr. Ing. Rudolf Hell GmbH, Fed. Rep. of Germany

[21] Appl. No.: 902,900

[22] Filed: May 4, 1978

[51] Int. Cl.² ............................................. H04N 1/36
[52] U.S. Cl. ................................... 358/262; 358/284
[58] Field of Search ..................... 358/262, 280, 284; 340/347 AD

[56] References Cited
U.S. PATENT DOCUMENTS

| 3,303,284 | 2/1967 | Lender | 358/262 |
| 3,495,032 | 2/1970 | Smith | 358/262 |

FOREIGN PATENT DOCUMENTS 1762644 7/1970 Fed. Rep. of Germany .
2114149 9/1971 Fed. Rep. of Germany .

Primary Examiner—Robert L. Griffin
Assistant Examiner—Edward L. Coles
Attorney, Agent, or Firm—Hill, Van Santen, Steadman, Chiara & Simpson

[57] ABSTRACT

Apparatus and method for improving the picture quality during transmission of facsimile signals which have an image signal having a signal of a particular polarity but has an minimum amplitude to represent a first information state such as white and a maximum amplitude to represent a second information state such as black whereby due to changes of information of the signal inverter pulses are obtained for the formation of a signal of changed polarity such that the change in polarity represents an information state and the zero position represents the second information state.

13 Claims, 16 Drawing Figures

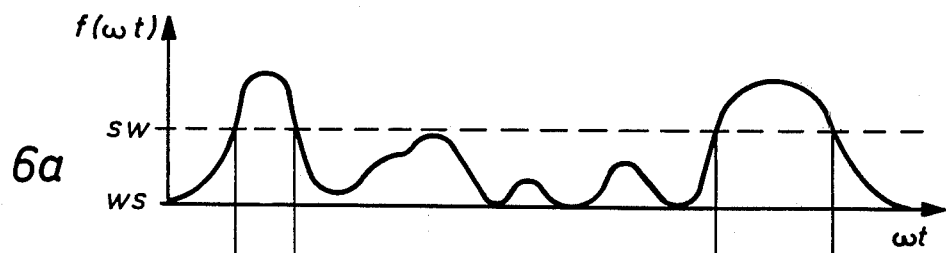
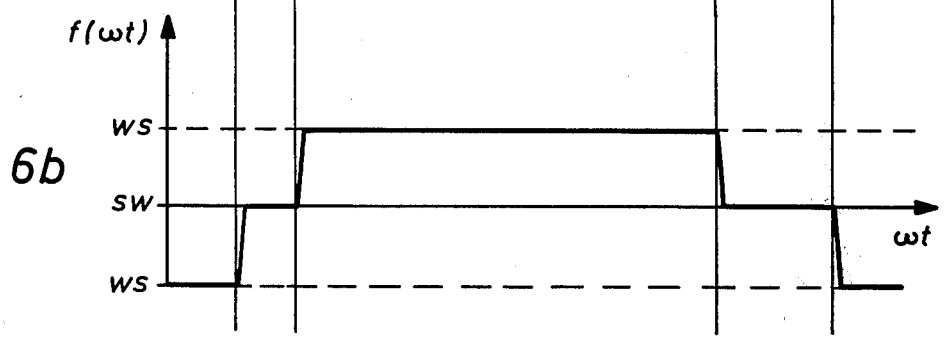
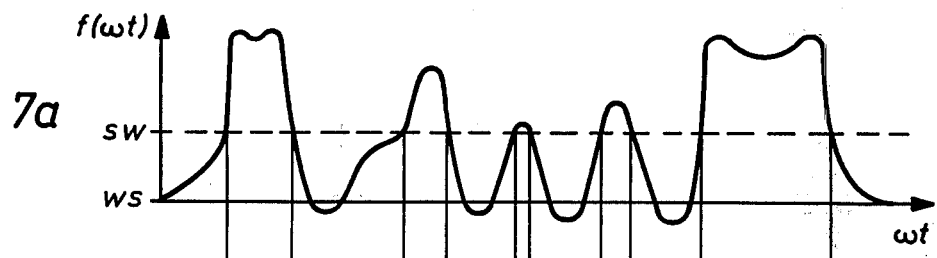
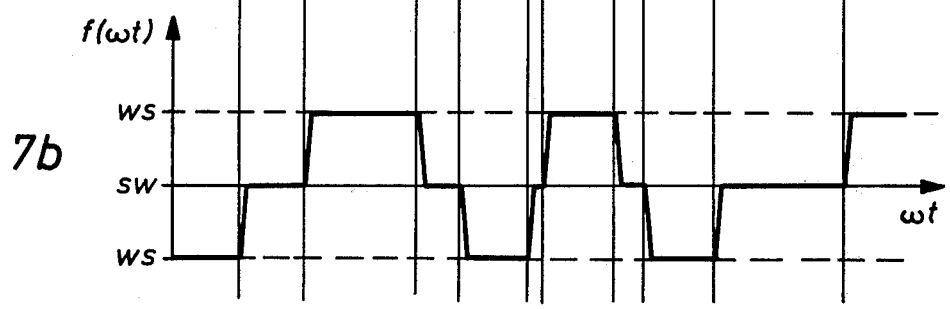

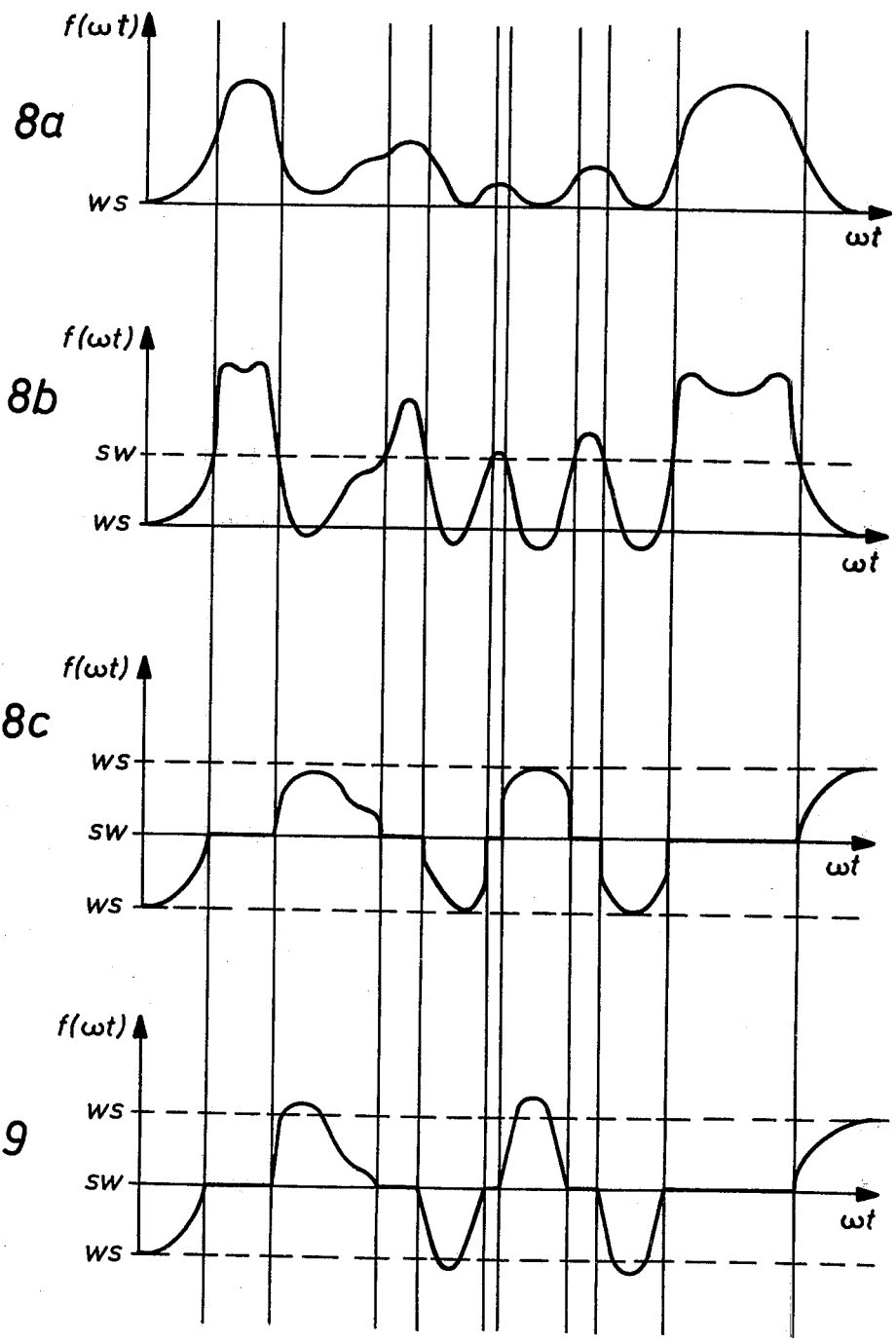

PROCESS FOR IMPROVING IMAGE QUALITY IN PICTURE TELEGRAPHY

BACKGROUND OF THE INVENTION

1. Field of the Invention

This invention relates in general to a process for improving the image quality in picture transmission of a facsimile system.

2. Description of the Prior Art

In facsimile transmission for example for long distance office copiers, weather map transmission or transmission of other documents by wire or wireless, the picture quality of the transmitted image suffers due to the imperfections of the transmission channel and the limitations in availability of sufficient bandwidth.

A frequently occurring example is that only black and white information transfer is required for letters, line drawings and the like. The picture signal which is obtained from the original by electro-optically scanning consists of a so-called two level signal which means that the signal has only two states which according to an arrangement the signal can either be black or white. If within the original there are only short lines of black, the scanner will also send out very short pulses which, however, in the process of transmission in the communication channel are distorted and at the receiver end arrive without noticeable amplitude and therefore their information cannot be recovered. If one tries to provide at the receiver a suitable amplifier so as to raise the signals over the recognition level a series of errors are introduced and echoes and other noise pulses distort the image information which makes this approach unsuitable. In present transmission techniques, a process of bandwidth reduction is used so as to save communication channel bandwidth or so as to increase the transmission speed and the two level signal is changed to a three level signal and transmitted as a three level signal. Such apparatus is described for example in U.S. Pat. No. 3,303,284 and in German Pat. No. 1,762,644.

The three level signal is obtained from the two level signal by inverting the signal whenever a change of information occurs which is to say that whenever the two level signal changes the result is a three level signal. The signal values of +/− and 0 will be experienced whereby in accordance with prior arrangement +/−1 is represented by the black areas and 0 is represented by the white areas of the original or vice versa.

During the resulting reduction to ½ of the base frequency in the three level signal case, the created signal can now be either transmitted at half the band width or twice the speed. At the receiver, the signal is converted again into a two level signal and recorded. However, this process has the problem that short black white lines of an original which were already reduced in their amplitude by the scanner aperture or lines which are wide however are below the trigger level in amplitude and will be lost because the amplitude of these signals will not be sufficient to invert the two level signal into a three level signal.

SUMMARY OF THE INVENTION

The present invention has for its objective to eliminate the disadvantages of the prior art system and to improve the image quality of the transmitted signal.

The present invention uses a technique known as image transmission field as double differentiation of the image signals during contour accentuation but a decided difference lies in the fact that it is not used in order to improve the signal contours during transmission but in order to transmit the complete image information of the original such that it arrives and can be recorded at the receiver clearly and distinctly. In known processes for increasing the slope of an impulse as disclosed for example in German Pat. No. 2,114,149, the information as explained above comprising very short black white lines or gray lines is lost during transmission between the scanner and the recorder and for this reason the solution given in German Pat. No. 2,114,149 is insufficient and the present invention corrects this deficiency and provides an improved transmitting apparatus and system.

Other objects, features and advantages of the invention will be readily apparent from the following description of certain preferred embodiments thereof taken in conjunction with accompanying drawings although variations and modifications may be effected without departing from the spirit and scope of the novel concepts of the disclosure and in which:

BRIEF DESCRIPTION OF THE DRAWINGS

FIGS. 6a and 6b are graphic representations of two level signals into three level signals, FIG. 7a and FIG. 7b illustrate plots of signals as according to the present invention;

FIGS. 8a through 8c comprise plots of signal transmitted by way of amplitude modulation;

FIG. 9 illustrates a plot of transmission by way of frequency modulation;

DESCRIPTION OF THE PREFERRED EMBODIMENTS

Figure 1:
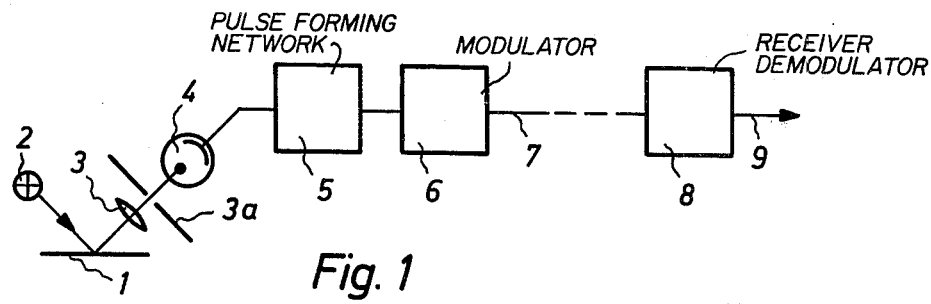
FIG. 1 illustrates a block diagram for transmitting facsimile signals.

FIG. 1 is a schematic view disclosing an original picture 1 which is illuminated by a light source 2 and which is scanned by a scanning head which includes an optical system 3, a scanner aperture 3a and an electronic optical transducer 4. The scanning head is of course moved line by line and advanced each line by a standard scanning mechanism, however, the details of the scanning drive system is not illustrated since such systems are well known to those skilled in the art. The transducer 4 produces an electrical output which is supplied to a pulse forming network 5 which provides an output to a modulator 6 where it is then furnished to the communication channel and transmitted either by wire or radio link to a receiving site. The receiver at the receiving site supplies an input to a receiver demodulator 8 which produces a video output signal to conductor 9 from which the facsimile signal is utilized to reproduce the desired information.

Figure 2:
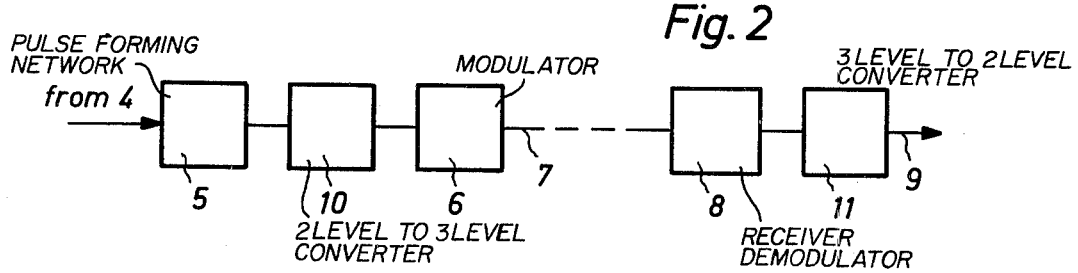
FIG. 2 illustrates a block diagram of the three level modulation system according to the invention.

FIG. 2 illustrates an example of the invention for the process of three level modulation. The signal output from the scanner transducer 4 is supplied to a pulse forming network 5 which corresponds to the stage 5 illustrated in FIG. 1 from which it is sent to a two level to 3 level converter 10 which has its output connected to the modulator 6. This modulator may be either an amplitude or frequency modulator depending on the particular application. The modulator 6 supplies the signal to the transmission link 7 where it is transmitted to the receiving site. At the receiver, a demodulator 8 similar to demodulator 8 illustrated in FIG. 1 is provided and the demodulator 8 supplies an output to a three level to two level converter 11 which produces the facsimile signal and supplies it to the output conductor 9.

Figure 3:
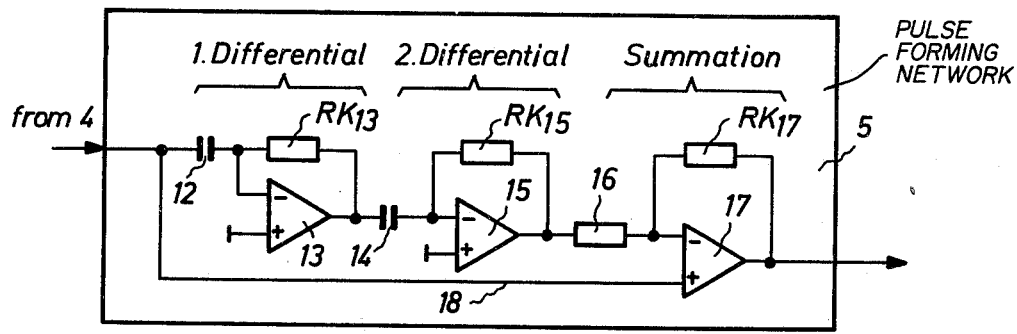
FIG. 3 illustrates an electrical schematic view for the pulse forming network.

FIG. 3 illustrates the internal construction of the pulse forming network 5 and in the present example a generally known approach of double differentiation of the image signal is used whereby the double differentiated signal with inverted polarity is fed back to the input of the differentiators. The signal from the scanner 4 is applied to an operational amplifier 13 at its negative input terminal through a capacitor 12 and a resistor $RK_{13}$ is connected between the output of the operational amplifier 13 and its input to which the signal from capacitor 12 is applied. A second capacitor 14 receives the output of operational amplifier 13 and supplies an input to a second operational amplifier 15 at its negative terminal and a resistor $RK_{15}$ is connected between the output of the amplifier 15 and its negative input terminal to which the capacitor 14 is connected. A resistor 16 is connected between the output of operational amplifier 15 and the negative input to operational amplifier 17. The output of the scanner 4 is also supplied to the positive terminal by lead 18 of the operational amplifier 17. A resistor $RK_{17}$ is connected between the output of operational amplifier 17 and the negative input of operational amplifier 17. As illustrated the operational amplifier with its associated capacitor and resistor comprise a first differentiator and the second operational amplifier 15 with its associated capacitor 14 and resistor $RK_{15}$ comprise a second differentiator and the operational amplifier 17 comprises an adding network for adding the signal from the scanner 4 to the double differentiated signal. The output of the operational amplifier 17 is supplied to an input terminal of the two level/three level converter 10 illustrated in FIG. 5.

Figure 4:
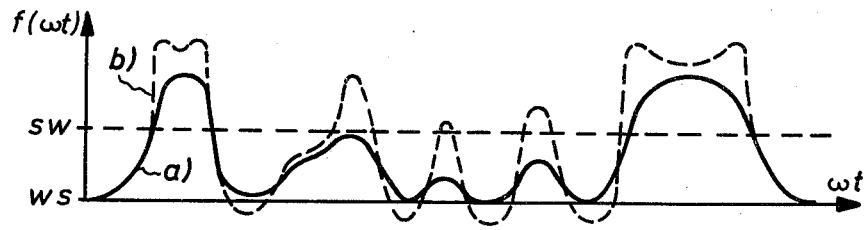
FIG. 4 is a plot of the signals occurring in the circuit of FIG. 3 against time.

FIG. 4 illustrates a first curve "a" which represents in solid line the output signals supplied by the scanner 4. The dashed line curve illustrated by curve "b" represents the output of the operational amplifier 17 which has been accentuated by double differentiation. Instead of using double differentiation other known processes of scanning the surrounding field can be used which also causes a steepening of the transitions which are parallel to the scanner direction that will also result in signal shapes similar to curve "b" whereby the weak signals are accentuated so much that they are clearly recognized as above the trigger level or black which represents a change of information relative to the original.

Figure 5:
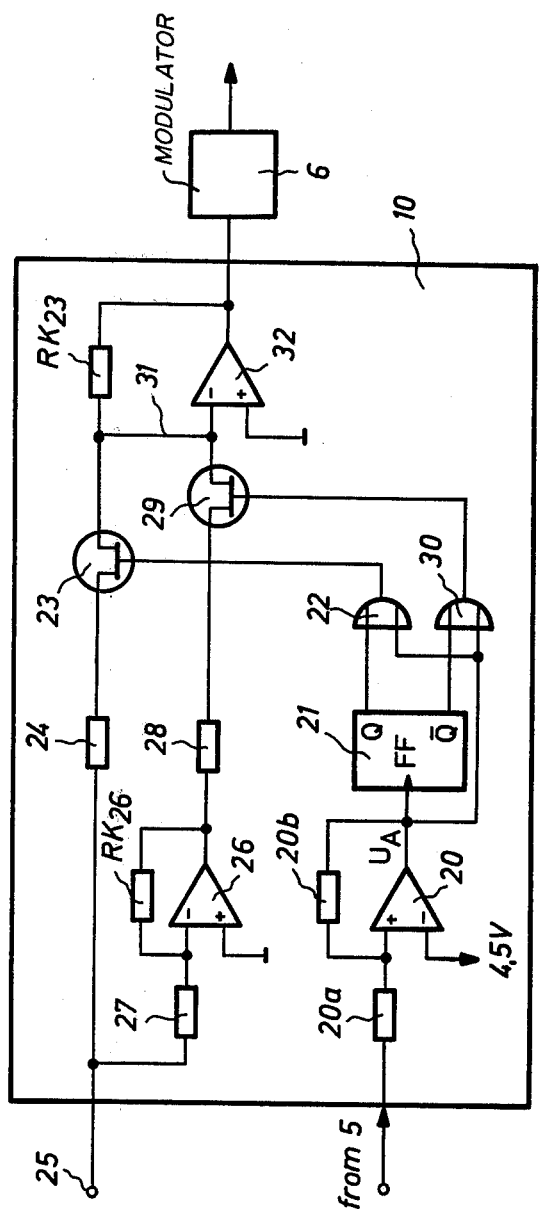
FIG. 5 is an electrical circuit wiring diagram for the conversion of a two level into a three level signal.

FIG. 5 illustrates a schematic view of the 2-level/3-level converter 10 illustrated in FIG. 2 which receives an input from the pulse forming network 5 that is supplied to a resistor 20a. The output of the converter 10 may be supplied to a modulator 6 that can be either an FM or an AM modulator. Since such modulators are well known to those skilled in the art, detail circuit diagrams for the modulators are not given. The two level signal produced by the pulse forming network 5 is passed through the resistor 20a to the plus input of a comparator 20 which consists of a differential amplifier that serves as an input stage and an output stage which has only two output signals which are zero volts or 5 volts. The negative input to the comparator 20 comprises a voltage which determines the height of the trigger level and might for example be 4.5 volts. A resistor 20b is connected between the plus input of comparator 20 and its output. The resistors 20a and 20b form a voltage divider which has the purpose to generate a switch hysteresis required for the special case if by chance an input signal is processed which corresponds precisely to the trigger level of 4.5 volts. This assures that due to noise that the comparator is not constantly caused to switch back and forth which is undesirable. The output of the comparator 20 is connected to a flip-flop 21 which has its Q output connected to OR gate 22 and its $\overline{Q}$ connected to a OR gate 30. The second inputs of the OR gates 22 and 30 are connected to the output of the comparator 20 as shown. The outputs of the OR gates 22 and 30 are respectively connected as gates to switches 23 and 29 which in a preferred embodiment might be field effect transistors and the switches 23 and 29 comprise analog switches which respectively carry the positive and inverted negative image signal.

The comparator 20 can comprise a type LM 311 made by National Semiconductor for example. The switch 23 receives by way of resistor 24 the positive image signal that may be supplied directly from the scanner 4 or from the pulse forming network 5 or in the case that a black/white transmission is occurring, a constant positive signal will be maintained on switch 23. The image signal supplied at input terminal 25 is also connected to an inverter circuit which comprises an input resistor 27 that has its otherside connected to the negative terminal of an operational amplifier 26. A regenerative resistor $RK_{26}$ is connected between the negative input terminal and the output of the operational amplifier 26. The output of operational amplifier 26 is supplied through a resistor 28 to the input of analog switch 29. In the case of a purely black/white transmission, a generally constant potential having the same height as the potential applied to switch 23 in the form of a positive polarity value would occur. The switches 23 and 29 may be simple analog switches for example transistors or they may be digital control MOS type switches such as type IH 5011 produced by the Intersil Company.

The circuit of FIG. 5 functions as follows. The comparator 20 which consists of the operational amplifier 20 may have at its negative input a voltage of 4.5 for example. If the input voltage of comparator 20 at its positive input which consists of the output signal from the pulse forming network 5 and the output voltage $U_A$ of the comparator 20 and the voltage divider formed by resistors 20a and 20b is smaller than 4.5 volts which means that it is smaller than the black trigger level, the following logic is valid:

The flip-flop 21 will be set to one of its states such that its $\overline{Q}$ output will have a value of 1 and its $\alpha$ will have the output of 0. Because the output of the comparator is also 0, the following is valid for the OR gates 22 and 30. Gate 22 has the combination of 0/0 and gate 30 the combination of 1/0. This means that switch 23 will be open and switch 29 will be closed. This causes the negative signal to pass through the switch 29. If the voltage at the positive input of comparator 20 exceeds the value of 4.5 volts the output voltage of the comparator 20 $U_A$ will increase to +5 volts and the input of the flip-flop will become positive. Its outputs however remain unchanged because the flip-flop will be switched only by a trailing edge of the signal. However, there will be changes at the inputs of the OR gates 22 and 30. Gate 22 will have the combination of 0/1 and gate 30 the combination of 1/1. This means that both gates 22 and 30 will switch and also the switches 23 and 29 will both be conducting which causes the generation of equally large positive and negative signals at the addition point 31 which results in a total signal of 0 at the negative input of operational amplifier 32 which is supplied to the input of the modulator 6.

If the input voltage at the positive input of comparator 20 falls again below the trigger value of 4.5 volts the output voltage of the comparator 20 will take the value of 0 which means that a negative flank is formed which switches the flip-flop 21 to a combination of 1/0 and the gates 22 and 30 to the following states.

Gate 22 will have the state of 1/0 and gate 30 the state of 0/0 which means that switch 23 passes signals and a positive output signal will occur at the output of the amplifier 32. If the input signal at the operation amplifier 20 again exceeds the trigger value, the flip-flop 21 remains unchanged but the OR gates 22 and 30 will receive new signal combinations. The gate 22 will receive the states of 1/1 and gate 30 the states of 0/1 which means that both switches 23 and 29 will pass signals which means that their added signals are again 0.

The above explained operations can be observed with the consideration of FIGS. 6a, 6b and FIGS. 7a and 7b.

In FIG. 5, the additional operational amplifier 32 which follows the switches 23 and 29 has a regenerative resistor RK23 connected between its output and its negative input. The resistors 24 and 28 in circuit with the switches 23 and 29 also provide that the amplifier 32 operates as a simple adder stage. The output of the operational amplifier 32 is connected to the modulator 6 and from the modulator 6 the signal reaches the transmission link. So as to further clarify the manner in which the present invention differs from processes of the prior art which utilize three level modulation, the simple case wherein only black and white transmission occurs can be considered relative to FIGS. 6a, 6b, 7a and 7b.

FIGS. 6a and 6b illustrates the transmission without pulse flank steepening for inversion and FIG. 7a and 7b illustrate transmission including pulse flank steepening for inversion.

The case illustrated in FIG. 6a shows the signal as provided by the scanner which corresponds approximately to the signal "a" of FIG. 4. It has the signal sequence of WS, SW, WS, SW, WS, SW, WS where WS designates which and SW designates black.

FIG. 6b illustrates the signal sequence of the three level signal WS, SW, WS, SW, WS. It can be easily observed that since the information content of the WS and SW values in the middle range of the curve corresponds according to FIG. 6a were lost because their amplitudes were not sufficient to exceed the trigger level for black which resulted in all values being transmitted as being white.

FIG. 7a illustrates the same signal sequence of FIG. 6a, however, pulse flanks steepening has been used. It is easily observed that also in the middle range the black values of the curve exceed the trigger level for black thus causing also the middle range values for the three level signal of FIG. 6 in the form of black/white steps to be a part of the three level signal and to be transmitted.

It is to be realized, of course, that the present invention however is not limited to black/white only transmissions as illustrated in FIG. 7a and FIG. 7b but also half tone can be transmitted by the process of the invention. When transmission if by amplitude modulation it has been shown to be advantageous to choose for the input signal of the comparator 20 of FIG. 5 the flank steepened image signal and for the input signal of terminal 25 that is for the switches 23 and 29 the image signal which has not been processed such as shown in FIGS. 8a, 8b and 8c.

In the case of frequency modulation, it is preferable to use the image signal after flank steepening in both cases such that the terminal 25 can be connected to the input of the comparator 20. The corresponding curves are illustrated in FIGS. 8a, 8b and FIG. 9. FIG. 8a represents the signal supplied by the scanner 4. FIG. 8b represents the signal provided by the pulse forming network 5 and FIG. 8c represents the signal generated at the output of the two level/three level transducer 10 illustrated in FIG. 5.

The intersections of the flank steepened image signals of FIG. 8b with the trigger level which represents the value for black result in the inversion points for the two level/three level converter which are indicated by vertical lines in FIGS. 8a, 8b and 8c. The curve shape illustrated in FIG. 8c which comprises the output signal generated by the converter 10 is caused by the function of the switches 23 and 29 depending upon the comparator control voltage and the follower OR gates illustrates in FIG. 5. At the points where the three level signal assumes the value of 0 both switches 23 and 29 are closed such that the sum voltage of 0 results. In the positive regions of FIG. 8c, the switch 23 is opened and the negative regions the switch 29 is opened. FIG. 8c represents the case wherein by means of the analog switches 23 and 29 the image signals of FIG. 8 which have not had their flank steepened are passed by the switches whether they be positive or negative polarity. FIG. 9 illustrates the output signal of the two level/three level converter where the flank steepened signal of FIG. 8b is supplied to the analog switches 23 and 29 which is an example which illustrates the advantage for the application of frequency modulation.

Figure 10:
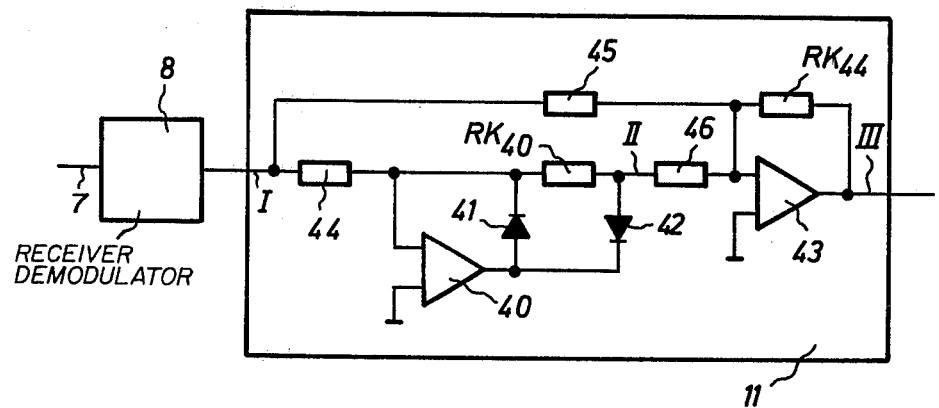
FIG. 10 is an electrical schematic diagram of a demodulator of the receiver.

FIG. 10 illustrates the demodulator 8 and a three level/two level converter 11. Commercially available circuit that can be used for the demodulator 8 is disclosed in the handbook "Electrische Nachrichtentechnik" Volumes I and II by Dr. Ing. Heinrich Schroeder, Verlag Fuer Radio-Foto-Kino-Technik, Berlin-Borsigwolde. The three level/two level converter 11 consists of a full wave rectifier which is made of two parts comprising an operational amplifier 40 which has its one input connected through the resistor 44 to the output of the demodulator 8. The output of the operational amplifier 40 is connected to a pair of diodes 41 and 42 connected in opposite polarity with their other ends connected to opposite sides of a resistor RK 40 and with the output of the operational amplifier 40 connected to the second side of the diode 41. The diodes 41 and 42 are connected in opposite polarity and the output of the resistor RK 40 is connected to the simple adder stage comprising a resistor 46 which has its other side connected to the input of an operational amplifier 43. The output of the operational amplifier 43 is connected through a feedback resistor RK 44 to the input of operational amplifier 43. A resistor 45 is connected between the output of the demodulator 8 and the input of the operational amplifier 43. The resistors of the operational amplifier comprising RK40 and the protective resistors 44, 45 and 46 are designed such that one half of the received signal which was not rectified is added to the full amplitude of the rectified signal which results in a two level signal conversion from the three level signal.

Figure 11:
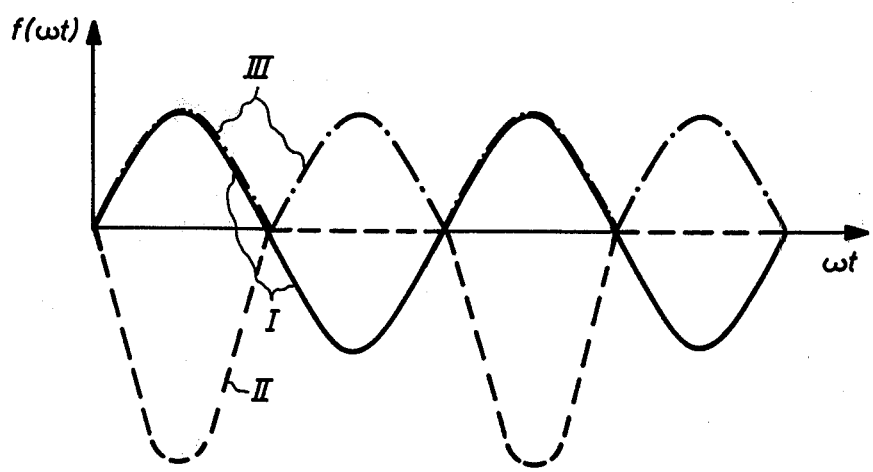
FIG. 11 is a plot of signals of the three level/two level converter.

The operation of this circuit is further explained with the use of FIG. 11. The curve I of solid line represents the non-rectified signal, the curve II of dash line represents the rectified signal of twice the amplitude and curve III represents the inverted adder signal which is present at the output of the operational amplifier 43. The curve III is represented by dash dot for example. As can be observed, signal III is a two level signal. In FIG. 11, a pure sign wave is used by way of illustration so as to make it easy to explain the operation of the circuits.

Figure 12:
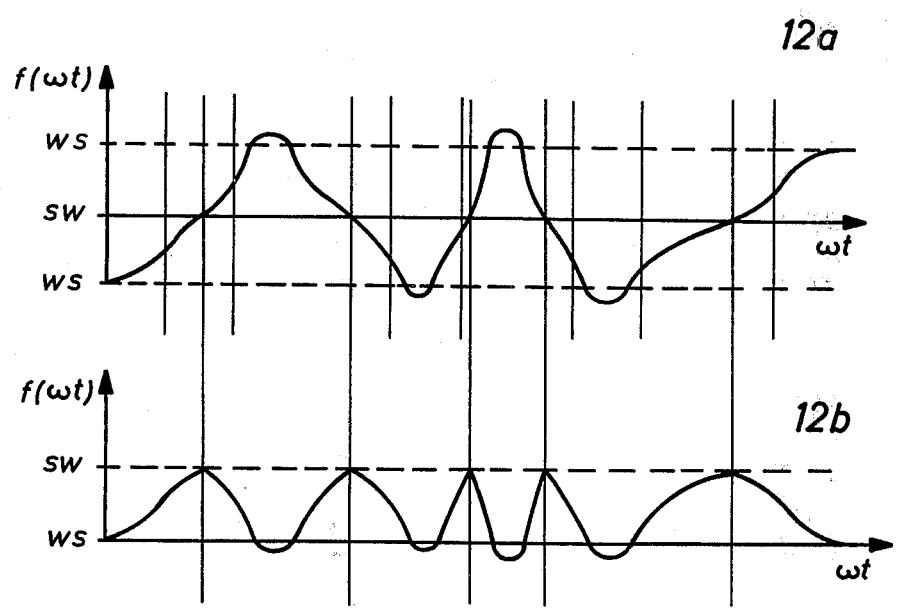
FIGS. 12a and 12b are plots of signals occurring in the invention.

FIGS. 12a and 12b illustrate signal conditions with FIG. 12a showing the three level signal after line transmission and reception which, for example, originated as the transmitted signal shown in FIG. 9 and which shows the sum distortion due to band width limitations of the transmitted signal. FIG. 12b illustrates the two level signal which represents the states of black and white after rectification.

It is seen that the present invention provides an improved fascimile transmitting system and although it has been described with respect to preferred embodiments it is not to be so limited as changes and modifications may be made which are within the full intended scope as defined by the appended claims.

We claim as our invention:

1. An improved facsimile system comprising scanning signal generating means connected to a scanning means which scans an original to be transmitted, a pulse forming network including a differentiator receiving the output signal of said scanning signal generating means to differentiate it, a two level to three level converter receiving the output signal of said pulse forming network which includes an inverter which inverts said output signal, a first switch receiving said output signal a second switch receiving the output of said inverter, the outputs of said first and second switches connected together, a comparator receiving the output of said pulse forming network, a pair of OR gates receiving first inputs from said comparator, a flip-flop circuit receiving the output of said comparator and supplying inputs to said pair of OR gates, and the outputs of said pair of OR gates respectively connected to said first and second switches to turn them on and off.

2. An improved facsimile system according to claim 1 wherein said pulse former includes a second differentiator and a scanning means.

3. An improved facsimile system according to claim 2 including an operational amplifier receiving the outputs of said first and second switches, and a modulator connected to the output of said operational amplifier.

4. An improved facsimile system according to claim 3 wherein said modulator is an AM modulator.

5. An improved facsimile system according to claim 3 wherein said modulator is an FM modulator.

6. An improved facsimile system according to claim 3 including a data link connected to said modulator, a receiver demodulator connected to said data link, and a three level to two level converter connected to said demodulator to produce an output signal indicative of two conditions.

7. An improved facsimile system according to claim 6 wherein said three level to two level converter comprises a full wave rectifier and an adder stage which adds the input to said full wave rectifier to the output of said rectifier.

8. A process for the improvement of picture quality during the transmission of facsimile picture signals comprising the steps of generating a first electrical picture signal by opto-electrically scanning a picture original, said picture signal varying in amplitude according to the contrast range of the picture original, generating a second picture signal from the first picture signal by steepening the first picture signal, forming a switching signal from the second picture signal which is changing between a predetermined switching level and zero level, whereby the changes from the zero level to the switching level occur when the second picture signal reaches a predetermined threshold value and the changes from the switching level to the zero level occur when the second picture signal falls below the threshold value and the generation of the switching signal is formed by comparing the second picture signal with said threshold value, generating a transmission signal from the switching signal, said transmission signal having portions of opposite polarities, said portions having two equal amplitudes, both amplitudes representing the same information state (white or black) and having signal portions of a zero level representing the other information state (black or white) of the picture signal, whereby the transmission signal has zero level when the switching signal occurs and has the portions of the opposite polarity during the times when the switching signal changes from the switching level to the zero level and when it changes from the zero level to the switching level.

9. A process according to claim 8 comprising the steps of generating the transmission signal from the first picture signal whereby the portions of opposite polarity of the transmission signal are generated by alternately inverting or not inverting the sections of the first picture signal which occur during the time when the switching signal changes from the switching level to the zero level and when it changes from the zero level to the switching level.

10. A process according to claim 8 comprising the steps of generating the transmission signal from the second picture signal whereby the portions of opposite polarity of the transmission signal are generated by alternately inverting or not inverting the sections of the second picture signal which occur during the time when the switching signal changes from the switching level to the zero level and when it changes from the zero level to the switching level.

11. A process according to claim 8 comprising the steps of generating the transmission signal from the switch signal and two constant value voltages of opposing polarity whereby the portions of opposite polarity of the transmission signal are generated by alternately switching the constant value voltages during the time when the sections of the switching change from the switching level to the zero level and when it changes from the zero level to the switching level.

12. A process according to claim 8 including the steps of generating the second picture signal from the first picture signal by doubly differenciating the first picture signal and adding the doubly differenciated signal to the first picture signal in opposing polarity and comparing the summation signal to a trigger level in order to form the switching signal.

13. A process according to claim 8 including the steps of superimposing a surrounding field signal on the first picture signal and comparing the summation signal to a reference trigger level in order to form the switching signal.

* * * * *